(12) United States Patent
Yoshisaka et al.

(10) Patent No.: US 10,259,319 B2
(45) Date of Patent: Apr. 16, 2019

(54) DIFFERENTIAL DEVICE

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 46 days.

(21) Appl. No.: 15/723,623

(22) Filed: Oct. 3, 2017

(65) Prior Publication Data
US 2018/0099562 A1 Apr. 12, 2018

(30) Foreign Application Priority Data

Oct. 7, 2016 (JP) ................................ 2016-199265
Oct. 7, 2016 (JP) ................................ 2016-199266

(51) Int. Cl.
| | |
|---|---|
| *F16H 48/24* | (2006.01) |
| *B60K 23/04* | (2006.01) |
| *F16D 11/14* | (2006.01) |
| *F16H 48/40* | (2012.01) |
| *F16H 48/08* | (2006.01) |
| *F16H 48/34* | (2012.01) |

(52) U.S. Cl.
CPC .............. *B60K 23/04* (2013.01); *F16D 11/14* (2013.01); *F16H 48/24* (2013.01); *F16H 48/40* (2013.01); *F16H 48/08* (2013.01); *F16H 2048/346* (2013.01)

(58) Field of Classification Search
CPC .. B60K 17/346; B60K 17/3462; B60K 23/04; F16D 11/14; F16D 27/10; F16D 27/108; F16H 48/40; F16H 48/08; F16H 48/20; F16H 48/38
See application file for complete search history.

(56) References Cited

U.S. PATENT DOCUMENTS

| | | | |
|---|---|---|---|
| 6,015,361 A | 1/2000 | Yamazaki et al. | |
| 2002/0155913 A1* | 10/2002 | Fusegi | B60K 23/04 475/150 |
| 2017/0297428 A1* | 10/2017 | Inose | F16D 27/112 |

FOREIGN PATENT DOCUMENTS

| | | |
|---|---|---|
| JP | 10-078110 | 3/1998 |
| JP | 2009-228840 | 10/2009 |

* cited by examiner

*Primary Examiner* — Mark J Beauchaine
(74) *Attorney, Agent, or Firm* — Oblon, McClelland, Maier & Neustadt, L.L.P.

(57) ABSTRACT

In a differential device, a differential case includes a first engaging part having engaging teeth on a first side wall of the differential case. A clutch member is disposed between the first side wall and a second side wall of the differential case in an axial direction. The clutch member includes a second engaging part. An urging member is disposed between the second side wall and the clutch member such that the urging member is compressed in the axial direction. When an actuator does not generate a pressing force, the first engaging part and the second engaging part are engaged with each other by the urging force of the urging member, and the differential case and the input member are connected together via the clutch member. The first engaging part is disengaged from the second engaging part by the pressing force provided due to actuation of the actuator.

9 Claims, 7 Drawing Sheets

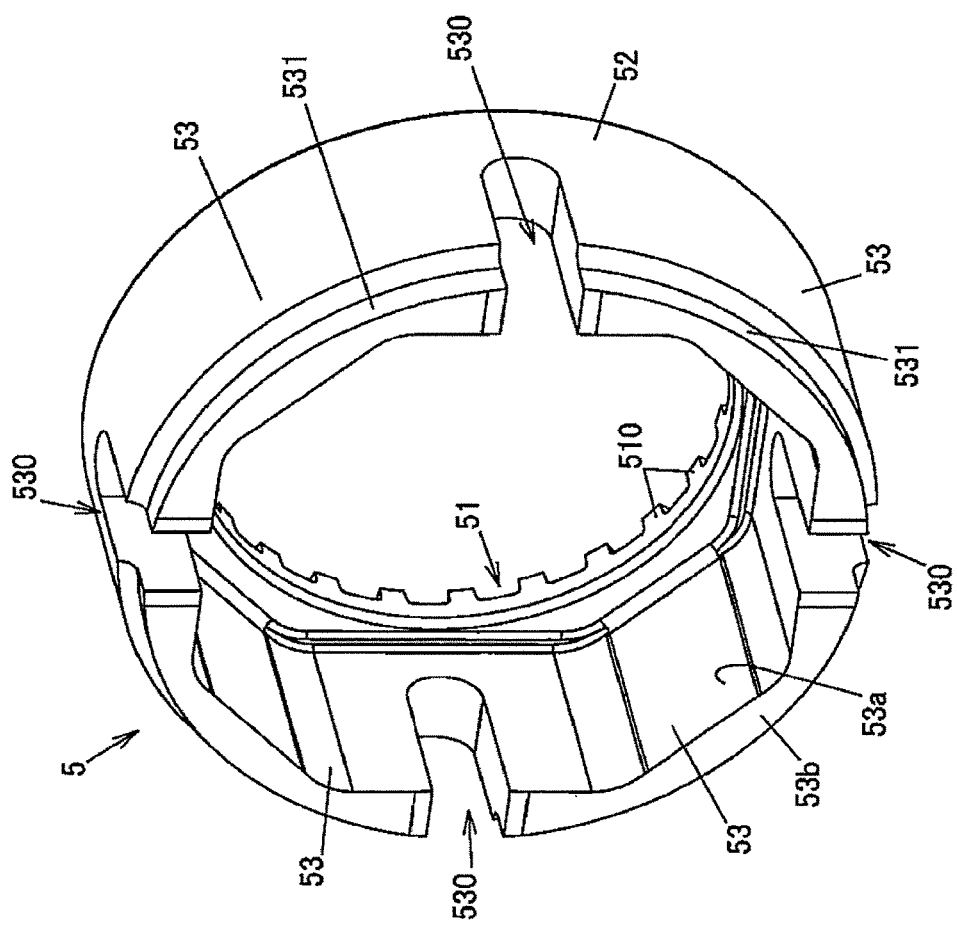
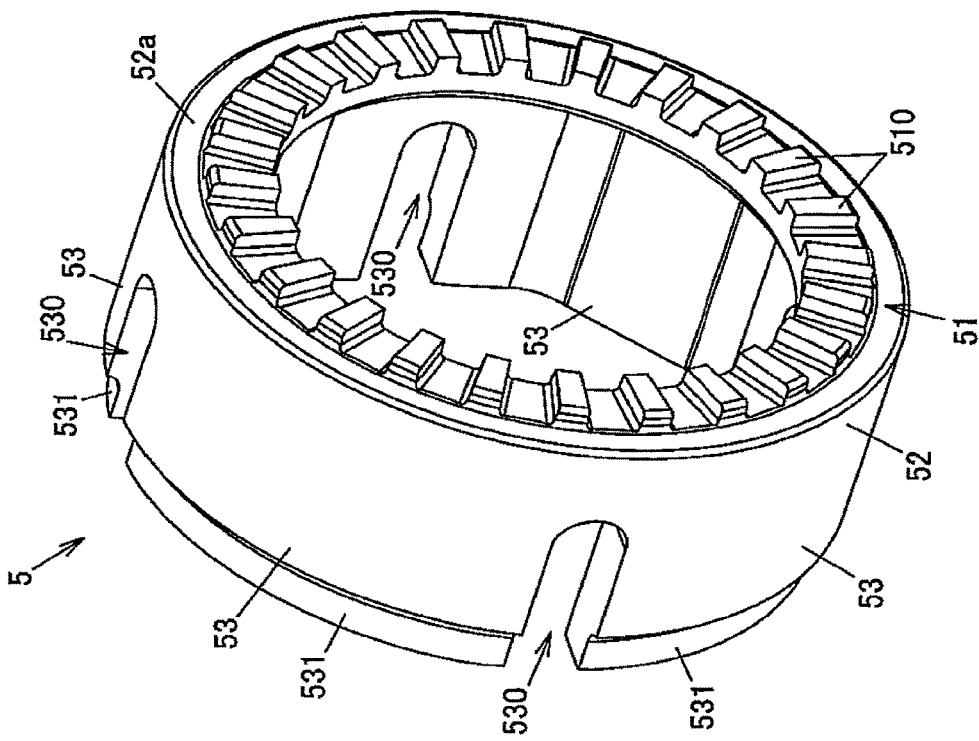

DIFFERENTIAL DEVICE

INCORPORATION BY REFERENCE

The disclosure of Japanese Patent Application No. 2016-199265 filed on Oct. 7, 2016 and Japanese Patent Application No. 2016-199266 filed on Oct. 7, 2016, each including the specification, drawings and abstract, is incorporated herein by reference in its entirety.

BACKGROUND

1. Technical Field

The disclosure relates to a differential device.

2. Description of Related Art

There has been known a differential device which is provided in a four-wheel-drive vehicle including main drive wheels and auxiliary drive wheels, and which can distribute a driving force of a driving source to the right and left auxiliary drive wheels while permitting differential operation of the right and left auxiliary drive wheels, and can interrupt transmission of the driving force to the auxiliary drive wheels (for example, see Japanese Unexamined Patent Application Publication No. 10-78110 A (JP 10-78110 A)).

The differential device described in JP 10-78110 A includes an outer case; an inner case which is disposed in the outer case; a differential mechanism which is accommodated in the inner case; a clutch member which is disposed so as to be movable in an axial direction in the outer case; and an actuator which causes the clutch member to move in the axial direction. The actuator is disposed outside the outer case. The clutch member can switch the state of the differential device between a connected state and an unconnected state by moving in the axial direction. In the connected state, the outer case and the inner case are connected together such that the outer case and the inner case are not rotatable relative to each other. In the unconnected state, the inner case is rotatable relative to the outer case. In the connected state, a driving force input to the outer case is distributed from the differential mechanism to the right and left auxiliary drive wheels, and thus, a vehicle is brought to a four-wheel-drive state. In the unconnected state, the transmission of the driving force to the auxiliary drive wheels is interrupted, and thus, the vehicle is brought to a two-wheel-drive state in which the driving force is transmitted to only the main drive wheels.

In the differential device described in JP 10-78110 A, engaging teeth are formed on surfaces of the outer case and the clutch member, the surfaces facing each other. The clutch member and the inner case are connected together such that they are movable in the axial direction relative to each other, and they are not rotatable relative to each other, through mutual engagement between a plurality of projections projecting in the axial direction from respective surfaces facing each other. A shift spring formed of a coil spring is disposed between the clutch member and the inner case at a position outside the plurality of protections. The shift spring urges the clutch member in a direction in which the clutch member engages with the outer case. When the actuator is not actuated, the clutch member engages with the outer case due to an urging force of the shift spring, and thus, the driving force is transmitted from the outer case to the inner case via the clutch member. When the actuator is actuated, the actuator presses the clutch member via a pressure plate, thereby disengaging the clutch member from the outer case.

In the differential device with the above-described configuration, it is not necessary to actuate the actuator when the vehicle is traveling in the four-wheel-drive state. Accordingly, it is possible to reduce heat generation of the actuator and power consumption even when the vehicle travels on a road with a low friction coefficient μ, for example, on a snow road for a long time.

In the differential device described in JP 10-78110 A, the shift spring is disposed in a small clearance between the plurality of protections of the inner case and the clutch member and an inner peripheral surface of the outer case, and therefore, it is difficult to use a shift spring with a large spring consonant. Accordingly, there is a possibility that limitation may be imposed on a magnitude of the driving force transmitted from the outer case to the clutch member. Further, if a large space for accommodating the shift spring is ensured, a diameter of the outer case is increased, and accordingly, a size and a weight of the differential device are increased.

SUMMARY

The disclosure provides a differential device in which an actuator does not need to be actuated when a vehicle travels in a four-wheel-drive state, and a sufficient pressing force of an urging member for urging a clutch member is ensured.

A differential device according to an aspect of the disclosure includes a differential mechanism configured to distribute a driving force input to an input member to a pair of output members while permitting differential operation of the output members; a differential case that accommodates the differential mechanism; a clutch member accommodated in the differential case together with the differential mechanism and disposed such that rotation of the clutch member relative to the input member is restricted and the clutch member is rotatable relative to the differential case; an urging member formed of an elastic body and configured to urge the clutch member toward one side in an axial direction parallel to a rotation axis of the differential case; and an actuator configured to generate a pressing force for moving the clutch member toward another side in the axial direction against an urging force of the urging member. The differential case includes a first engaging part having a plurality of engaging teeth on a first side wall of the differential case, the clutch member being disposed between the first side wall and a second side wall of the differential case in the axial direction. The clutch member includes a second engaging part having a plurality of engaging teeth at an end part of the clutch member, the end part being located on a side of the first side wall. The urging member is disposed between the second side wall and the clutch member such that the urging member is compressed in the axial direction. When the actuator does not generate the pressing force, the first engaging part and the second engaging part are engaged with each other by the urging force of the urging member, and the differential case and the input member are connected together via the clutch member such that the differential case and the input member are not rotatable relative to each other. The first engaging part is disengaged from the second engaging part by the pressing force provided due to actuation of the actuator.

With the differential device according to the above aspect, it is not necessary to actuate the actuator when the vehicle travels in the four-wheel-drive state, and it is possible to ensure the urging force of the urging member configured to urge the clutch member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a perspective view illustrating a clutch member of the differential device when viewed from a first engaging part-side;

DETAILED DESCRIPTION OF EMBODIMENTS

An embodiment of the disclosure will be described with reference to FIGS. 1 to 6. Note that the embodiment described below is provided as an example for implementing the disclosure, but a technical scope of the disclosure is not limited to the embodiment.

Figure 1:
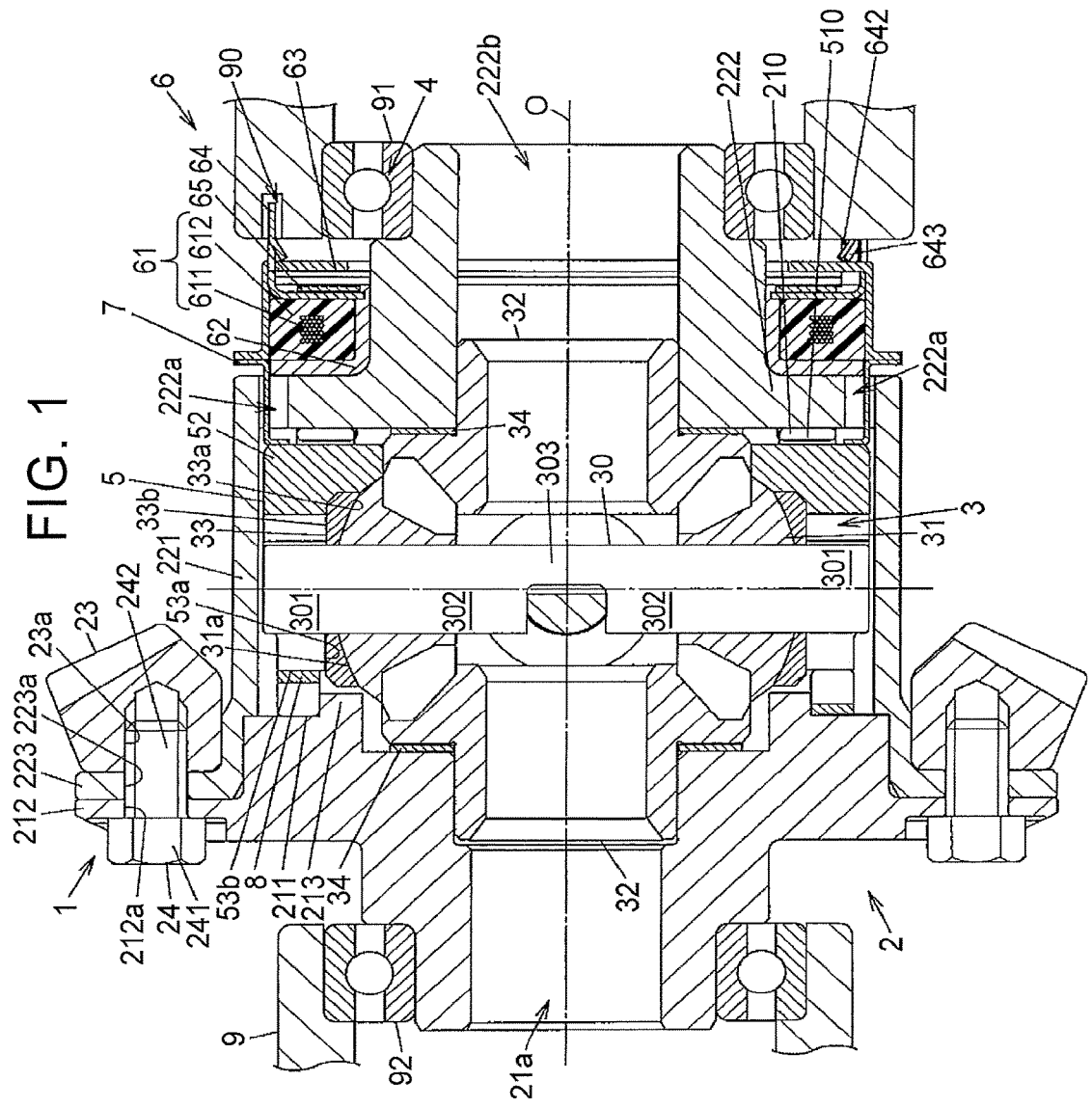
FIG. 1 is a sectional view illustrating a configuration example of a differential device according to an embodiment of the disclosure.
Figure 2:
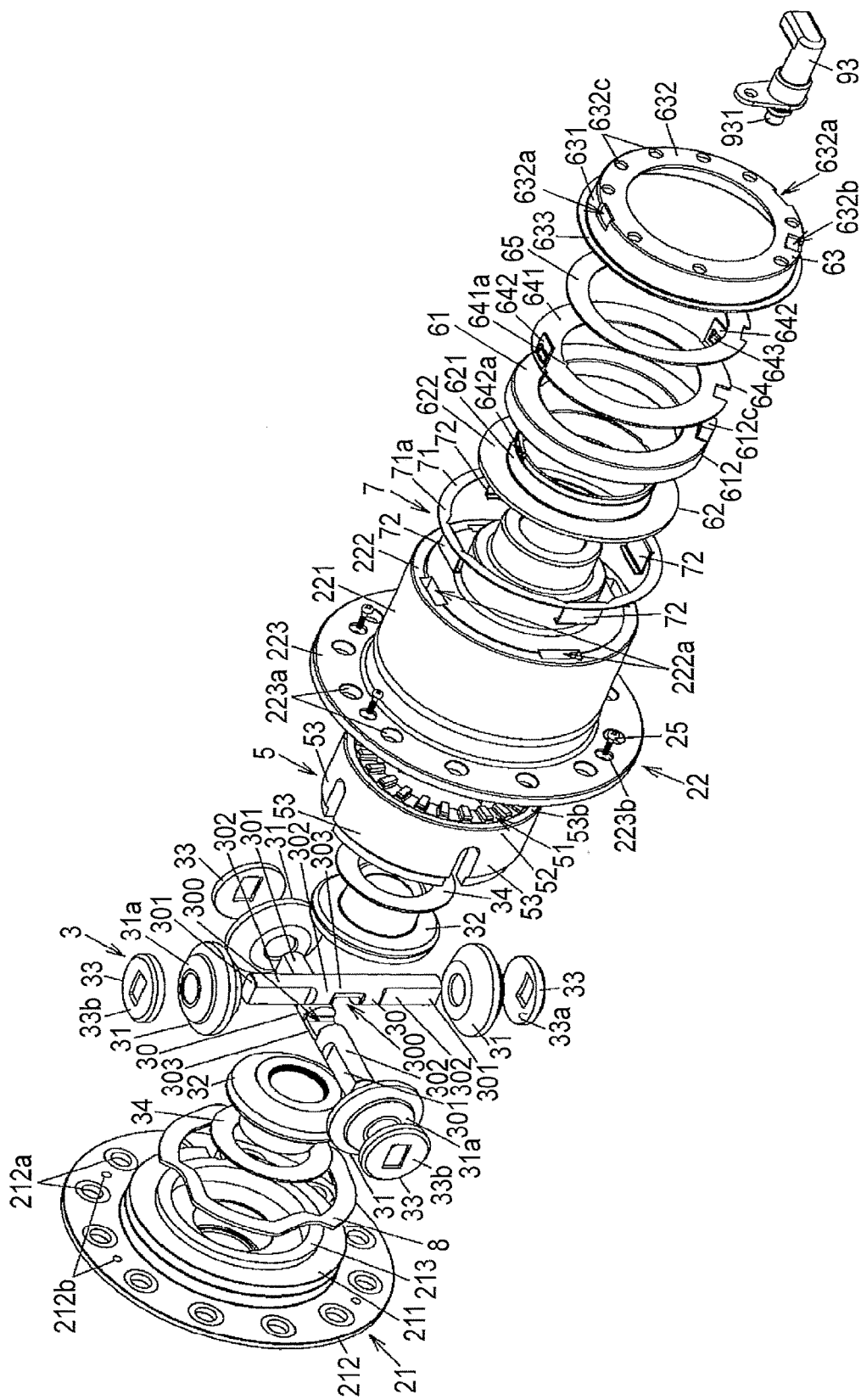
FIG. 2 is an exploded perspective view of the differential device.
Figure 3:
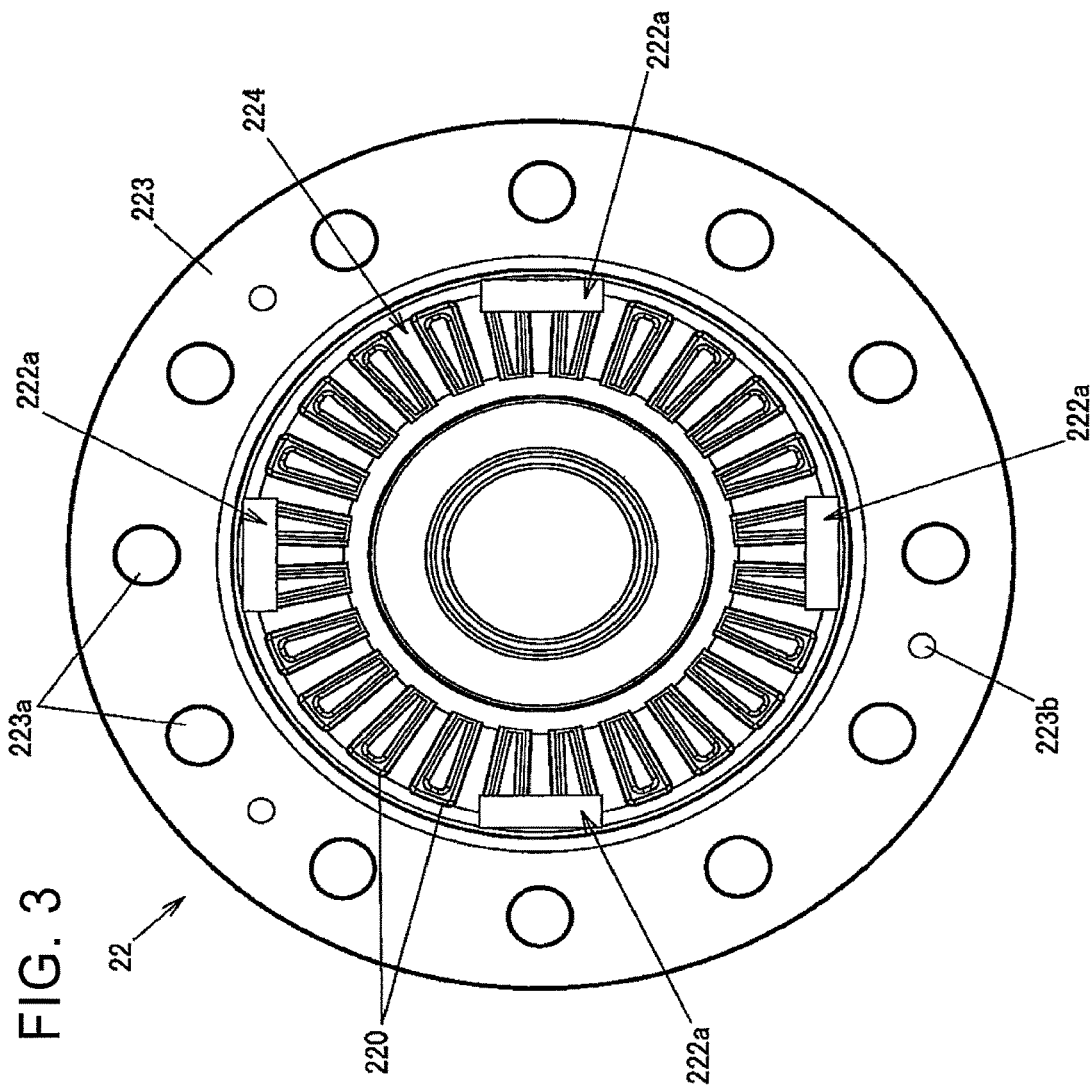
FIG. 3 is a plan view of a second case member of the differential device when viewed from a first case member-side.
Figure 5:
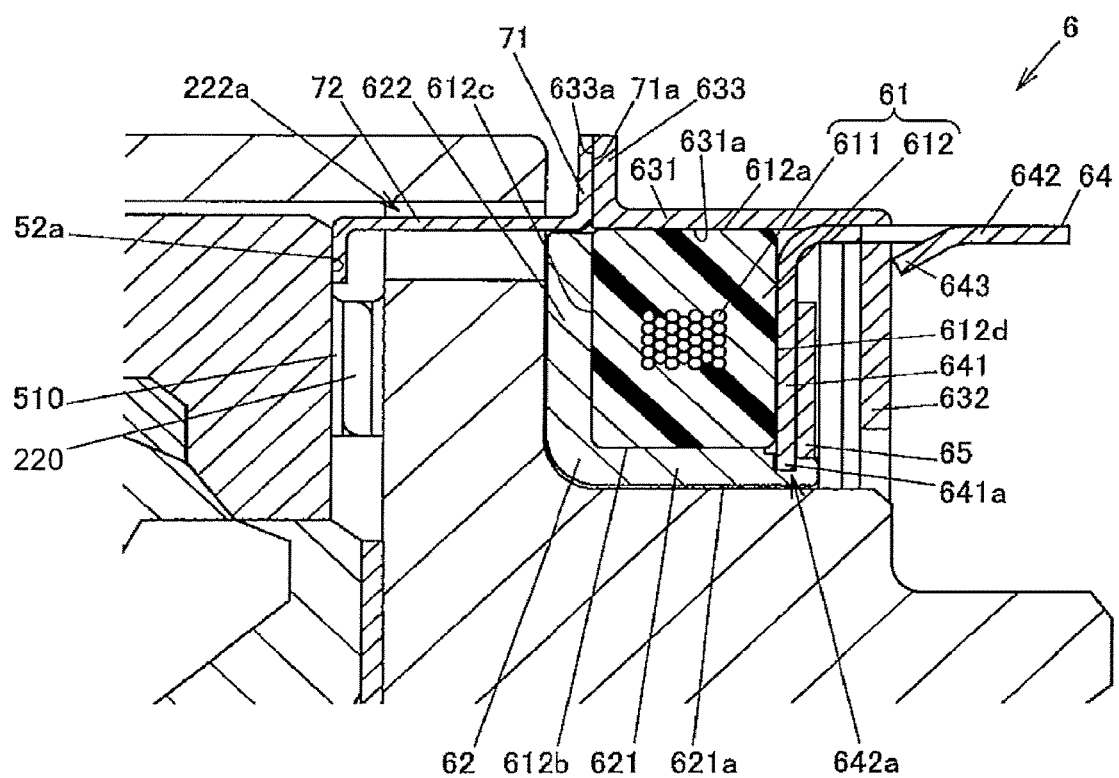
FIG. 5 is a partially enlarged sectional view of the differential device, which illustrates operation of the differential device in a state in which an actuator is not actuated.
Figure 6:
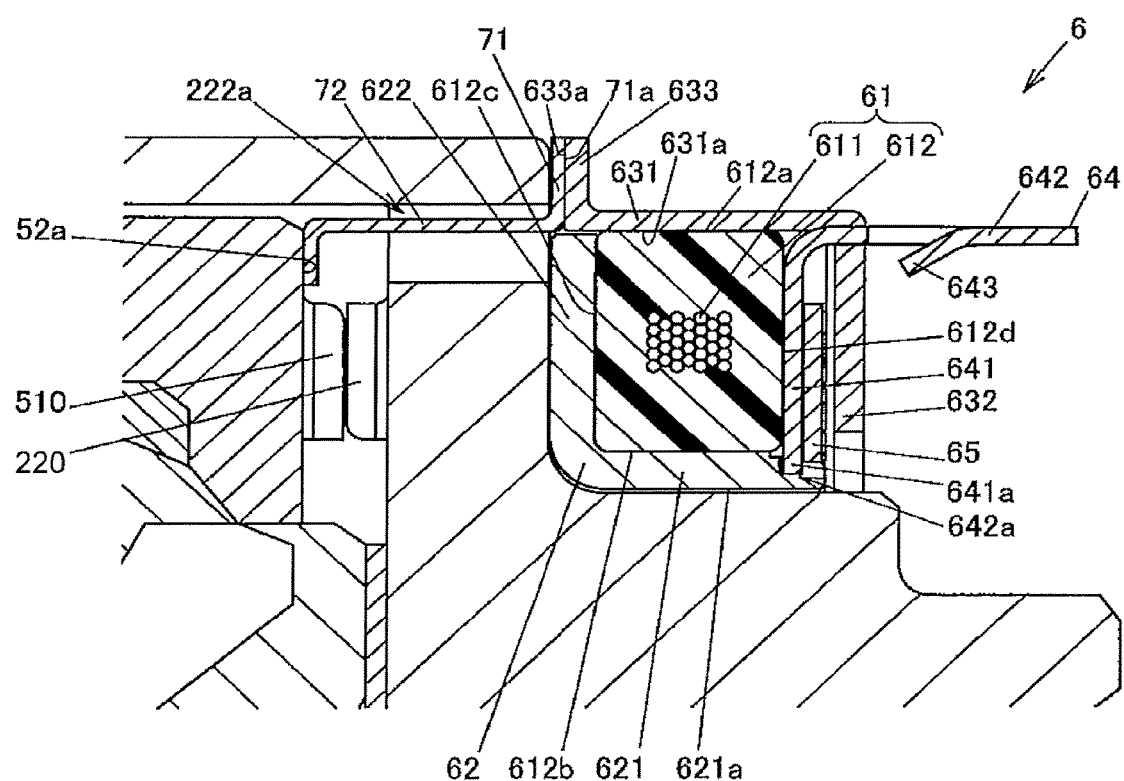
FIG. 6 is a partially enlarged sectional view of the differential device, which illustrates operation of the differential device in a state in which the actuator is actuated.

FIG. 1 is a sectional view illustrating a configuration example of a differential device according to a first embodiment of the disclosure. FIG. 2 is an exploded perspective view of the differential device. FIG. 3 is a plan view of a second case member of the differential device when viewed from a first case member-side. FIGS. 4A and 4B are perspective views illustrating a clutch member of the differential device. FIG. 5 is a partially enlarged sectional view of the differential device, which illustrates operation of the differential device in a state in which an actuator is not actuated. FIG. 6 is a partially enlarged sectional view of the differential device, which illustrates operation of the differential device in a state in which the actuator is actuated.

A differential device 1 according to the present embodiment is used as a differential device which is provided in a four-wheel-drive vehicle including a pair of right and left main drive wheels (for example, front wheels) to which a driving force of a driving source such as an engine is constantly transmitted; and a pair of right and left auxiliary drive wheels (for example, rear wheels) to which the driving force of the driving source such as the engine is transmitted in accordance with a traveling state, the differential device allocating the driving force to the right and left auxiliary wheels. Moreover, the differential device 1 is capable of stopping and continuing the transmission of the driving force to the auxiliary drive wheels. In a case where the driving force is transmitted to the main drive wheels only, the vehicle is in a two-wheel-drive state. In a case where the driving force is transmitted to the main drive wheels and the auxiliary drive wheels, the vehicle is in a four-wheel-drive state. In the four-wheel-drive state, the differential device 1 distributes the input driving force to right and left drive shafts for the auxiliary drive wheels.

The differential device 1 includes a differential case 2 which is supported so as to be rotatable via a pair of bearings 91 and 92 at a differential carrier 9 as a storage member fixed to a vehicle body; a differential mechanism 3 which is accommodated in the differential case 2; and a clutch mechanism 4 which allows and interrupts transmission of a driving force between the differential case 2 and the differential mechanism 3. Lubricating oil (differential oil) for lubricating the differential mechanism 3 is introduced into the differential case 2.

The differential case 2 is formed by connecting together a first case member 21 and a second case member 22 which are arranged in a direction along a rotation axis O. The first case member 21 is molded by, for example, forging, and has a disc shape which covers an opening of the second case member 22. The first case member 21 integrally includes a flange part 212 contacting a flange part 223 of the second case member 22. The first case member 21 has a shaft insertion hole 21a through which a drive shaft is inserted. The drive shaft is connected to one of a pair of side gears 32 such that the drive shaft is not rotatable relative to the side gear 32.

The second case member 22 has a bottomed cylindrical shape and accommodates the differential mechanism 3 and the clutch member 5. The second case member 22 integrally includes a cylinder part 221 with a cylindrical shape; a side wall 222 which extends inwardly from one end part of the cylinder part 221 opposite to another end part on a side of the first case member 21; and the flange part 223 which projects outwardly from the other end part of the cylinder part 221. The differential case 2 accommodates the clutch member 5 such that the clutch member 5 is sandwiched in the axial direction between the side wall 222 of the second case member 22 as a first side wall at one of both end parts of the differential case 2, and a side wall 211 of the first case member 21 as a second side wall at the other of the both end parts.

The side wall 222 has a plurality of (four) through-holes 222a at intervals of approximately 90 degrees in a circumferential direction of the differential case 2. The through-hole 222a is formed at a position that does not face engaging teeth 510 of a second engaging part 51 of the clutch member 5. The through-hole 222a extends through the differential case 2 in an axial direction parallel to the rotation axis O. The side wall 222 has a shaft insertion hole 222b formed at a central part of the side wall 222. A drive shaft is inserted through the shaft insertion hole 222b. The drive shaft is connected to one of the pair of side gears 32 such that the drive shaft is not rotatable relative to the side gear 32. The plurality of through-holes 222a and the shaft insertion hole 222b extend through the side wall 222 in the direction parallel to the rotation axis O. The differential case 2 also has, on an inner surface of the side wall 222 (a surface facing the first case member 21), a first engaging part 224 having a plurality of engaging teeth 220. The plurality of engaging teeth 220 are provided at equal intervals over the entire circumference, in a partial region in a radial direction in the inner surface of the side wall 222. The plurality of engaging teeth 220 of the first engaging part 224 is also a side face spline which is formed radially on a surface of the side wall 222 of the second case member 22, the surface facing the clutch member 5.

A driving force is input to the differential case 2 from a ring gear 23 (see FIG. 1) fixed to the flange parts 212, 223 of the first and second case members 21, 22. In the present embodiment, the ring gear 23 is fixed so as to rotate integrally with the differential case 2 by a plurality of fastening bolts 24 which are respectively inserted through a plurality of bolt insertion holes 212a formed at the flange part 212 of the first case member 21 and a plurality of bolt insertion holes 223a formed at the flange part 223 of the second case member 22. The fastening bolt 24 has a head part 241 contacting the flange part 212 of the first case member 21 and has a shank part 242 which has a male thread. The shank part 242 is inserted through the bolt insertion holes 212a, 223a to be screwed into a screw hole 23a of the ring year 23.

The first case member 21 and the second case member 22 are connected together by a plurality of connecting bolts 25 (see FIG. 2). In the present embodiment, the first case member 21 and the second case member 22 are connected together by the four connecting bolts 25 before the ring gear 23 is fastened. Three of the connecting bolts 25 are illustrated in FIG. 2. The connecting bolt 25 is inserted through a bolt insertion hole 223b formed at the flange part 223 of the second case member 22 to be screwed into a screw hole 212b formed at the first case member 21.

In the differential mechanism 3, a driving force of a driving source input to an input member can be distributed to a pair of output members while differential operation of the output members is permitted. In other words, the differential mechanism 3 includes at least three rotational elements, and the driving force of the driving source input to a first rotational element of the above-described rotational elements can be transmitted to second and third rotational elements while the differential operation of the second and third rotational elements is permitted. In the present embodiment, the differential mechanism 3 includes, as the rotational elements, a pair of pinion shafts 30, four pinion gears 31, and the pair of side gears 32. The pair of pinion shafts 30 is an example of the input member, and the pair of side gears 32 is an example of the pair of output members. In other words, the pair of pinion shafts 30 is an example of the first rotational element, and the pair of side gears 32 is an example of the second and third rotational elements. Two of the four pinion gears 31 are supported at one of the pinion shafts 30, and the other two of the four pinion gears 31 are supported at the other of the pinion shafts 30. The pinion gears 31 and the side gears 32 are bevel gears, and engage with each other with gear shafts thereof being orthogonal to each other.

The right and left drive shafts are respectively connected to the side gears 32 such that each of the drive shafts is not rotatable relative to the corresponding side gear. A washer 34 with a circular plate shape is disposed between one of the side gears 32 and the first case member 21 and another washer 34 is disposed between the other of the side gears 32 and the second case member 22. Note that each of the pinion gears 31 and the side gears 32 has a plurality of gear teeth, although they are not illustrated in FIG. 2.

Each of the pinion shafts 30 integrally includes a pair of engagement parts 301 which engages with the clutch member 5 of the clutch mechanism 4 (described later); a pair of pinion gear support parts 302 inserted through the pinion gears 31; and a coupling part 303 which couples together the pair of pinion gear support parts 302. Each of the pinion shafts 30 has a shaft shape as a whole. The engagement parts 301 are respectively provided at both end parts of the pinion shaft 30, and the coupling part 303 is provided at an axial central part of the pinion shaft 30. Each of the pinion gear support parts 302 is provided between the corresponding engagement part 301 and the coupling part 303, and supports the corresponding pinion gear 31.

The pinion shafts 30 engage with each other at the axial central part of the pinion shafts 30. More specifically, the coupling part 303 of one of the pinion shafts 30 engages with a recessed part 300 formed between the pair of pinion gear support parts 302 in the other of the pinion shafts 30, and the coupling part 303 of the other of the pinion shafts 30 engages with a recessed part 300 formed between the pair of pinion gear support parts 302 in the one of the pinion shafts 30. The pinion shafts 30 are orthogonal to each other when viewed along the rotation axis O of the differential case 2.

The clutch mechanism 4 includes the clutch member 5 which is able to move in a central axis direction extending along the rotation axis O of the differential case 2; a wave washer 8 as an urging member which urges the clutch member 5 toward one side in an axial direction (in other words, the central axis direction) parallel to the rotation axis O of the differential case 2; an actuator 6 which generates a pressing force for pressing and moving the clutch member 5 toward another side in the axial direction (in other words, the central axis direction) against the urging force of the wave washer 8; and a transmission member 7 which is disposed between the clutch member 5 and the actuator 6. The clutch member 5 is accommodated in an inside of the differential case 2. More specifically, the clutch member 5 is accommodated in the differential case 2 together with the differential mechanism 3, and is disposed between the differential mechanism 3 and the cylinder part 221 of the second case member 22. The actuator 6 is disposed outside the differential case 2, more specifically, outside the side wall 222 of the second case member 22. The transmission member 7 transmits the pressing force of the actuator 6 to the clutch member 5. The transmission member 7 includes shaft parts 72 which are inserted through the through-holes 222a. With the configuration, the actuator 6 presses the clutch member 5 via the through-holes 222a.

The clutch member 5 has a cylindrical shape whose central axis is coincident with the rotation axis O of the differential case 2. The clutch member 5 is disposed such that the clutch member 5 is movable relative to the differential mechanism 3 in the central axis direction along the rotation axis O of the differential case 2, and is not rotatable relative to the differential mechanism 3. The clutch member 5 is disposed such that rotation of the clutch member 5 relative to the pinion shafts 30 is restricted and the clutch member 5 is rotatable relative to the differential case 2.

The clutch member 5 is formed by forging a steel material, and has a cylindrical shape whose central axis is coincident with the rotation axis O of the differential case 2 as illustrated in FIGS. 2, 4A, and 4B. More specifically, the clutch member 5 integrally includes a main body part 52 with a cylindrical shape; and a plurality of (four) leg parts 53. Base end parts of the leg parts 53 are continuous with the main body part 52. The leg parts 53 extend in the axial direction toward the side wall 211 of the first case member 21. The clutch member 5 also includes a second engaging part 51 having a plurality of engaging teeth 510, the second engaging part 51 being provided over the entire circumference of the main body part 52. The second engaging part 51 is provided at an end part of the clutch member 5, the end part being located on a side of the side wall 222 of the second case member 22 (in other words, the second engaging part 51 is provided on a surface of the clutch member 5, which faces the side wall 222). More specifically, the second engaging part 51 is provided on an axial end surface 52a of the main body part 52. Engaging portions 530 are provided such that each of the engaging portions 530 is located between the leg parts 53 adjacent to each other. The engaging portion 530 extends from the second engaging part 51-side to the first case member 21-side. The pinion shafts 30 engage with the engaging portions 530 in the circumferential direction. The plurality of engaging teeth 510 of the second engaging part 51 is a side face spline which is formed radially on the end surface 52a of the main body part 52 of the clutch member 5, the end surface 52a being on the side of the side wall 222 of the second case member 22.

A first engaging part 224 is provided on an inner surface of the side wall 222 of the second case member 22 at a position facing the second engaging part 51 in the central axis direction along the rotation axis O of the differential case 2. The second engaging part 51 engages, in the circumferential direction, with the first engaging part 224 provided at the second case member 22. The through-holes 222a are formed so as to be located in an outer peripheral portion of the first engaging part 224. Note that in an example of FIG. 3, each of the through-holes 222a is formed so as to be opened in parts of outer peripheral portions of the engaging teeth 220 in a radial direction of the second case member 22. However, the engaging teeth 510 of the second engaging part 51 of the clutch member 5 entirely engage with inner peripheral portions of the engaging teeth 220, which are located radially inward of the through-holes 222a. However, the plurality of engaging teeth 220 may be formed only in portions radially inward of the through-holes 222a.

Each engaging portion 530 of the clutch member 5 is formed as a groove which extends between inner and outer peripheral surfaces of the leg parts 53 of the clutch member 5 and which extends in the central axis direction of the clutch member 5. Each leg part 53 of the clutch member 5 has an annular receiving surface 53b which receives the urging force of the wave washer 8 as an urging member (described later). The receiving surface 53b is located at an axial end surface of a distal part 531 opposite to the second engaging part 51.

The engagement parts 301 provided at the end parts of the pinion shafts 30 engage with the engaging portions 530. While an engagement state is maintained, the clutch member 5 is movable relative to the differential case 2, and is movable relative to the pinion shafts 30 in the axial direction parallel to the rotation axis O of the differential case 2 and is not rotatable relative to the pinion shafts 30. The engagement state is a state in which the engagement parts 301 of the pinion shafts 30 engage with the engaging portions 530 provided among the plurality of leg parts 53 (i.e., each of the engagement parts 301 engages with the corresponding engaging portion 530 between the adjacent leg parts 53). In other words, the clutch member 5 is disposed so as to be movable relative to the differential case 2 in the axial direction, and is able to connect together the differential case 2 and the pinion shafts 30 such that the differential case 2 and the pinion shafts 30 are not rotatable relative to each other. The plurality of pinion gears 31 rotate (revolve) around the rotation axis O of the differential case 2 together with the clutch member 5. In the present embodiment, the engagement parts 301 respectively provided at the end parts of the pinion shafts 30 engage with the clutch member 5, and therefore, the four engaging portions 530 are formed among the leg parts 53 (in other words, the four engaging portions 530 are formed such that the engagement parts 301 engage with the clutch member 5).

A washer 33 is disposed between a back surface 31a of each of the plurality of pinion gears 31 and inner peripheral surfaces 53a of the leg parts 53 of the clutch member 5. The washer 33 has an inner surface 33a which faces the back surface 31a of the pinion gear 31. The inner surface 33a has a partially spherical shape. The washer 33 also has an outer surface 33b which faces the inner peripheral surfaces 53a of the leg parts 53 of the clutch member 5. The outer surface 33b has a planar shape. When each pinion gear 31 rotates with the pinion shaft 30 serving as a center, the back surface 31a of the pinion gear 31 slides on the inner surface 33a of the washer 33. When the clutch member 5 moves in the center axis direction with respect to the pinion shaft 30, the inner peripheral surfaces 53a of the leg parts 53 of the clutch member 5 slide on the outer surface 33b of the washer 33.

The transmission member 7 includes an annular part 71 which contacts the side wall 222 of the second case member 22; and a plurality of shaft parts 72 which extend from the annular part 71 in parallel with the rotation axis O of the differential case 2. The shaft parts 72 are inserted in the through-holes 222a, and slide on the axial end surface 52a of the main body part 52 of the clutch member 5, the axial end surface 52a being located on a side where the second engaging part 51 is provided. In the present embodiment, the four shaft parts 72 are provided in the transmission member 7, and are arranged equally, in other words, at equal intervals of approximately 90 degrees, in a circumferential direction of the annular part 71. Moreover, the transmission member 7 is formed by pressing a steel plate. A distal part (an end part opposite to a base end part on a side of the annular part 71) of each shaft part 72 is curved inward. The shaft parts 72 of the transmission member 7 are respectively inserted through the through-holes 222a. The shaft parts 72 slide on the axial end surface 52a of the leg parts 53 of the clutch member 5, and the axial end surface 52a faces openings of the through-holes 222a in the axial direction.

The actuator 6 includes an electric magnet 61 with an annular shape having a coil winding 611 and a mold resin part 612 in which the coil winding 611 is embedded; a yoke 62 serving as a magnetic path for a magnetic flux of the electric magnet 61 generated by energizing the coil winding 611; an armature 63 which makes sliding contact with the mold resin part 612 to be guided in a direction of the rotation axis O of the differential case 2 and which presses the transmission member 7; and a restriction member 65 which restricts axial movement of the yoke 62 with respect to the second case member 22 of the differential case 2. The mold resin part 612 has a rectangular sectional shape along the rotation axis O. The armature 63 moves the clutch member 5 in a direction in which the second engaging part 51 engages with the first engaging part 224 of the differential case 2, by a magnetic force generated by energizing the coil winding 611. In the clutch member 5, the second engaging part 51 is caused to engage with the first engaging part 224 by a pressing force of the actuator 6 transmitted via the transmission member 7.

An exciting current is supplied from a control unit (not illustrated), to the coil winding 611 via an electric wire (not illustrated) extending from a boss part (an axial end surface) 612c provided at the mold resin part 612. The actuator 6 is actuated by supplying the exciting current to the coil winding 611. Since the actuator 6 is disposed outside the differential case 2, it is easy to supply the current to the coil winding 611.

The yoke 62 is formed of soft magnetic metal such as low-carbon steel. As illustrated in FIGS. 5 and 6, the yoke 62 integrally includes a cylinder part 621 which covers an inner peripheral surface 612b of the mold resin part 612 from an inside; and a flange part 622 which projects outwardly from one axial end part of the cylinder part 621 and which covers the axial end surface 612c of the mold resin part 612. An inside diameter of the cylinder part 621 is slightly larger than an outside diameter of a portion of the differential case 2, the portion facing the inner peripheral surface 621a of the cylinder part 621.

A stopper ring 64 is fixed at an end part of the cylinder part 621 of the yoke 62, the end part being opposite to the flange part 622. The stopper ring 64 is formed of non-magnetic metal such as austenite stainless steel. The stopper ring 64 integrally includes an annular part 641 which is connected to the yoke 62; a pair of projection parts 642 which projects from the annular part 641 in the axial direction at two portions in a circumferential direction; and a fold-back part 643 which is folded back at a sharp angle from the distal part of the projection part 642. Rotation of the stopper ring 64 is prevented by locking the pair of projection parts 642 at a recessed part 90 of the differential carrier 9.

The annular part 641 faces, in the axial direction, an axial end surface 612d of the mold resin part 612 (an end surface opposite to the axial end surface 612c facing the flange part 622 of the yoke 62). The annular part 641 includes an engagement projection part 641a at an inner peripheral end part thereof. The engagement projection part 641a radially projects, and the engagement projection part 641a engages with an engagement recessed part 642a formed at the cylinder part 621 of the yoke 62. Rotation of the yoke 62 with respect to the differential carrier 9 is prevented by engaging the engagement projection part 641a with the engagement recessed part 642a by the stopper ring 64.

The armature 63 is formed of soft magnetic metal such as low-carbon steel, and integrally includes an outer annular part 631 with an annular shape which is disposed at an outer periphery of the electric magnet 61; a side plate part 632 which faces the electric magnet 61 in the axial direction; and a flange part 633 which is formed to project outwardly from an axial end part of the outer annular part 631, the axial end part being close to the differential case 2. The outer annular part 631 has a cylindrical shape which covers the electric magnet 61 from an outer peripheral side. The side plate part 632 projects inwardly from one axial end part of the outer annular part 631, and faces the restriction member 65 in the axial direction. The flange part 633 contacts the annular part 71 of the transmission member 7.

The armature 63 is supported at the electric magnet 61 with the inner peripheral surface 631a of the outer annular part 631 being in contact with the outer peripheral surface 612a of the mold resin part 612. When the armature 63 moves in the axial direction, the inner peripheral surface 631a of the outer annular part 631 slides on the outer peripheral surface 612a of the mold resin part 612.

As illustrated in FIG. 2, the side plate part 632 of the armature 63 has engagement holes 632a which engage with the projection parts 642 of the stopper ring 64; an insertion hole 632b through which the boss part 612c of the electric magnet 61 is inserted; and a plurality of (nine in an example illustrated in FIG. 2) oil holes 632c through which lubricating oil flows. A surface 71a of the annular part 71 of the transmission member 7 on a side opposite to the differential case 2 contacts a surface 653a of the flange part 633 on a side close to the differential case 2. The armature 63 is presented from falling off the stopper ring 64 by the fold-back part 643 of the stopper ring 64, and the armature 63 is prevented from rotating with respect to the differential carrier 9 by engaging the projection parts 642 with the engagement holes 632a. The projection parts 642 of the stopper ring 64 are inserted through the engagement holes 632a to be locked at the differential carrier 9.

The restriction member 65 is an annular member formed of soft magnetic metal such as low-carbon steel, and is disposed between the stopper ring 64 and the annular part (side plate part) 632 of the armature 63. The restriction member 65 has an inner peripheral end part fixed to an end part of the cylinder part 621 of the yoke 62 through, for example, welding, and the restriction member 65 restricts the axial movement of the stopper ring 64 with respect to the cylinder part 621 of the yoke 62.

The wave washer 8 as an urging member with an annular shape formed of an elastic body is disposed between distal parts 531 of the plurality of leg parts 53 and the side wall 211 of the first case member 21. In other words, the wave washer 8 is disposed between the first case member 21 and the differential mechanism 3. The wave washer 8 is fitted to an outer periphery of an annular projection 213 provided at an end part (end surface) of the first case member 21, the end part being located on a side of the second case member 22. The wave washer 8 contacts the receiving surfaces 53b at distal ends of the leg parts 53 of the clutch member 5. The wave washer 8 is disposed between the side wall 211 of the first case member 21 and the clutch member 5 such that the wave washer 8 is compressed in the axial direction (in the central axis direction). The clutch member 5 is urged toward the side wall 222 of the second case member 22 by the urging force (restoring force) of the wave washer 8.

Although the wave washer 8 is provided as the urging member in the present embodiment, the urging member is not limited to the wave washer 8, and the urging member may be formed by a coil spring or rubber. Although the wave washer 8 has an annular shape and is disposed between the differential mechanism 3 and the first case member 21 in the present embodiment, the disclosure is not limited to this configuration, and urging members may be respectively disposed at a plurality of portions facing the receiving surfaces 53b of the leg parts 53 of the clutch member 5.

The differential device 1 is switched between a connected state and an unconnected state by bringing the actuator 6 to an unactuated state and an actuated state. In the connected state, the second engaging part 51 and the first engaging part 224 are engaged with each other in the circumferential direction, and the clutch member 5 and the differential case 2 are connected together such that the clutch member 5 and the differential case 2 are not rotatable relative to each other. In the unconnected state, the clutch member 5 and the differential case 2 are rotatable relative to each other.

When no exciting current is supplied to the coil winding 611 of the electric magnet 61, that is, when the actuator 6 is not actuated such that no pressing force is generated, the clutch member 5 is urged toward the side wall 222 of the second case member 22 by the urging force of the wave washer 8, and thus, the second engaging part 51 and the first engaging part 224 are engaged with each other, and the differential case 2 and the clutch member 5 are connected together such that the differential case 2 and the clutch member 5 are not rotatable relative to each other. Consequently, the differential case 2 and the pinion shafts 30 are connected together such that the differential case 2 and the pinion shafts 30 are not rotatable relative to each other. In other words, the differential case 2 and the pinion shafts 30 are connected together via the clutch member 5 such that the differential case 2 and the pinion shafts 30 are not rotatable relative to each other. Moreover, when the electric magnet 61 is not energized, the armature 63 is returned to an initial position at which the side plate part 632 contacts the fold-back part 643 of the stopper ring 64, by the urging force of the wave washer 8 transmitted via the clutch member 5 and the transmission member 7.

When the actuator 6 is not actuated, the second engaging part 51 and the first engaging part 224 are engaged with each other, and thus, a driving force input to the first case member 21 of the differential case 2 from the ring gear 23 is transmitted to the drive shafts via the clutch member 5 and the pair of pinion shafts 30, the four pinion gears 31, and the pair of side gears 32 of the differential mechanism 3. Accordingly, a vehicle is brought to the four-wheel-drive state.

When the exciting current is supplied to the coil winding 611 of the electric magnet 61, the side plate part 632 of the armature 63 moves toward the flange part 622 (see FIG. 5) in the yoke 62 by a magnetic force of the electric magnet 61. Consequently, the transmission member 7 presses the clutch member 5 toward the first case member 21, thereby disengaging the second engaging part 51 from the first engaging part 224. More specifically, in the transmission member 7, the surface 71a of the annular part 71 opposite to the differential case 2 receives the pressing force of the actuator 6 via the flange part 633 of the armature 63. The pressing force presses the clutch member 5 toward the first case member 21. In other words, the first engaging part 224 is disengaged from the second engaging part 51 by the pressing force provided due to actuation of the actuator 6.

When the second engaging part 51 is disengaged from the first engaging part 224, the differential case 2 and the clutch member 5 become rotatable relative to each other, and thus, transmission of the driving force from the differential case 2 to the differential mechanism 3 is interrupted. Consequently, the driving force input from the ring gear 23 to the differential case 2 is not transmitted to the drive shaft, and thus, the vehicle is brought to the two-wheel-drive state.

An axial position of the armature 63 is detected by a position sensor 93 fixed at the differential carrier 9, and a detection signal obtained through the detection is transmitted to the control unit. The position sensor 93 includes a rod 931 which contacts the side plate part 632 of the armature 63. The control unit is able to recognize a position of the armature 63 based on the detection signal of the position sensor 93. Thus, the control unit is able to determine whether the second engaging part 51 and the first engaging part 224 are engaged with each other.

When the actuator 6 is brought to the actuated state from the unactuated state, the control unit supplies, to the electric magnet 61, the exciting current with a large value that makes it possible to move the clutch member 5 quickly. Then, when determining that the second engaging part 51 is disengaged from the first engaging part 224, the control unit reduces the value of the exciting current to a relatively small value at which the second engaging part 51 can be maintained to be disengaged from the first engaging part 224. Consequently, it is possible to reduce the power consumption.

Figure 7:
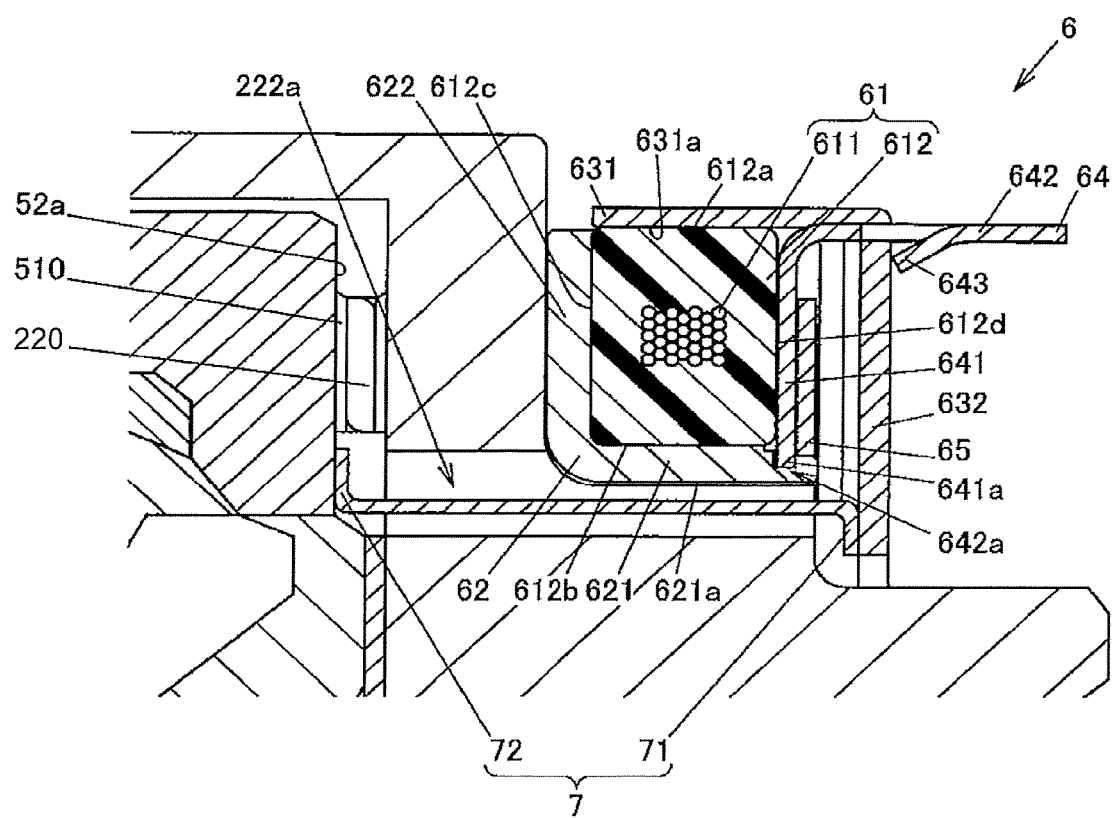
FIG. 7 is a partially enlarged sectional view of a differential device according to a modified embodiment of the disclosure.

FIG. 7 is a sectional view illustrating a differential device according to a modified embodiment in a partially enlarged manner. In the embodiment described above, the through-hole 222a is formed in the outer peripheral portion of the first engaging part 224, and the transmission member 7 is configured such that the distal end of the shaft part 72 is curved inward and the annular part 71 contacts the flange part 633 projecting outwardly from the outer annular part 631 of the armature 63. However, as illustrated in FIG. 7, the through-hole 222a may be formed in an inner peripheral portion of the first engaging part 224 having a plurality of engaging teeth 220, the distal part of the shaft part 72 may be curved outwardly, and the annular part 71 may contact an inner peripheral portion of the side plate part 632 of the armature 63. In this case, the flange part 633 may not be provided in the armature 63.

According to the first embodiment and the modified embodiment based on the first embodiment described above, the second engaging part 51 of the clutch member 5 and the first engaging part 224 of the differential case 2 are engaged with each other by the urging force of the wave washer 8, and thus, the vehicle is brought to the four-wheel-drive state. Thus, when the vehicle is traveling in the four-wheel-drive state, the electric magnet 61 does not need to be energized. Moreover, since the wave washer 8 is disposed between the side wall 211 of the first case member 21 and the clutch member 5, it is possible to ensure it sufficient space for accommodating the wave washer 8. Thus, in a case where the timing source generates the maximum output, it is possible to use an urging member having a large spring constant which can sufficiently maintain a state of the engagement between the second engaging part 51 of the clutch member 5 and the first engaging part 224 of the differential case 2.

Moreover, when the actuator 6 presses the clutch member 5 via the through-hole 222a formed at the side wall 222 of the second case member 22, the first engaging part 224 is disengaged from the second engaging part 51. Therefore, it is not necessary to fix the armature 63 and the transmission member 7 such that they cannot be separated from each other, and it is not necessary to fix the transmission member 7 and the clutch member 5 such that they cannot be separated from each other. Thus, it is possible to suppress an increase in the number of components and an increase in man-hours required for assembly.

The disclosure has been described based on the first embodiment and the modified embodiment described above. However, the disclosure is not limited to the embodiments, and thus, the embodiments may be modified without departing from the scope of the disclosure.

What is claimed is:
1. A differential device comprising:
a differential mechanism configured to distribute a driving force input to an input member to a pair of output members while permitting differential operation of the output members;
a differential case that accommodates the differential mechanism;
a clutch member accommodated in the differential case together with the differential mechanism and disposed such that rotation of the clutch member relative to the input member is restricted and the clutch member is rotatable relative to the differential case;
an urging member formed of an elastic body and configured to urge the clutch member toward one side in an axial direction parallel to a rotation axis of the differential case; and
an actuator configured to generate a pressing force for moving the clutch member toward another side in the axial direction against an urging force of the urging member, wherein
the differential case includes a first engaging part having a plurality of engaging teeth on a first side wall of the differential case, the clutch member being disposed between the first side wall and a second side wall of the differential case in the axial direction;

the clutch member includes a second engaging part having a plurality of engaging teeth at an end part of the clutch member, the end part being located on a side of the first side wall;

the urging member is disposed between the second side wall and the clutch member such that the urging member is compressed in the axial direction;

when the actuator does not generate the pressing force, the first engaging part and the second engaging past are engaged with each other by the urging force of the urging member, and the differential case and the input member are connected together via the clutch member such that the differential case and the input member are not rotatable relative to each other; and the first engaging part is disengaged from the second engaging part by the pressing force provided due to actuation of the actuator.

2. The differential device according to claim 1, wherein:

the clutch member includes a plurality of leg parts extending in the axial direction toward the second side wall; and the clutch member is movable in the axial direction relative to the differential case while an engagement state is maintained, the engagement state being a state in which the input member engages with portions among the plurality of leg parts.

3. The differential device according to claim 2, wherein:

the clutch member includes a main body part with a cylindrical shape, the second engaging part is provided over an entire circumference of the main body part, and base end parts of the plurality of leg parts are formed integrally with the main body part; and the urging member is disposed between distal parts of the plurality of leg parts and the second side wall.

4. The differential device according to claim 3, wherein:

the plurality of engaging teeth of the first engaging part is a side face spline radially provided on a surface of the first side wall, the surface of the first side wall facing the clutch member; and the plurality of engaging teeth of the second engaging part is a side face spline radially provided on an end surface of the main body part of the clutch member, the end surface of the main body part being located on the side of the first side wall.

5. The differential device according to claim 1, wherein:

the actuator presses the clutch member via a through-hole extending through the differential case in the axial direction;

the second engaging part is provided on a surface of the clutch member, the surface of the clutch member facing the first side wall of the differential case, and the through-hole being provided in the first side wall; and in the first side wall of the differential case, the through-hole is provided at a position that does not face the second engaging part.

6. The differential device according to claim 5, wherein:

the actuator includes a transmission member configured to transmit the pressing force to the clutch member; and the transmission member includes a shaft part inserted through the through-hole, and the transmission member presses the clutch member via the shaft part.

7. The differential device according to claim 6, wherein a sliding surface is provided in the clutch member at a position facing the through-hole in the axial direction, and the shaft part slides on the sliding surface.

8. The differential device according to claim 5, wherein the through-hole is provided in an inner peripheral portion of the first engaging part.

9. The differential device according to claim 5, wherein the through-hole is provided in an outer peripheral portion of the first engaging part.

* * * * *